United States Patent [19]
Sforza

[11] 4,105,362
[45] Aug. 8, 1978

[54] DOUBLE VORTEX AUGMENTOR WIND CONVERSION SYSTEM

[75] Inventor: Pasquale M. Sforza, Huntington, N.Y.

[73] Assignee: Polytechnic Institute of New York, Brooklyn, N.Y.

[21] Appl. No.: 803,438

[22] Filed: Jun. 6, 1977

Related U.S. Application Data

[63] Continuation-in-part of Ser. No. 564,681, Apr. 3, 1975, Pat. No. 4,047,832.

[51] Int. Cl.² .............................................. F03D 1/04
[52] U.S. Cl. ............................................ 415/2; 415/3; 415/DIG. 1
[58] Field of Search .................................. 415/2-4, 415/DIG. 1

[56] References Cited

U.S. PATENT DOCUMENTS

| | | | |
|---|---|---|---|
| 1,578,923 | 3/1926 | Schlotter | 415/4 X |
| 2,694,357 | 11/1954 | Lee | 415/DIG. 1 |
| 3,578,264 | 5/1971 | Kuethe | 415/DIG. 1 |
| 3,965,679 | 6/1976 | Paradiso | 415/2 X |
| 4,045,144 | 8/1977 | Loth | 415/2 X |
| 4,047,832 | 9/1977 | Sforza | 415/2 X |

FOREIGN PATENT DOCUMENTS

| | | | |
|---|---|---|---|
| 977,561 | 4/1951 | France | 415/2 |
| 992,353 | 6/1951 | France | 415/DIG. 1 |
| 605,673 | 8/1935 | Fed. Rep. of Germany | 415/2 |
| 606,119 | 11/1934 | Fed. Rep. of Germany | 415/DIG. 1 |
| 192,793 | 2/1923 | United Kingdom | 415/2 |
| 1,003,568 | 9/1965 | United Kingdom | 416/223 |

*Primary Examiner*—Everette A. Powell, Jr.
*Attorney, Agent, or Firm*—Morgan, Finnegan, Pine, Foley & Lee

[57] ABSTRACT

A fluid flow energy conversion system is disclosed which employs a pair of vortex generators to focus the broad diffuse flow intercepted by each planform into concentrated vortices of higher energy density; turbines are oriented in the vortices to convert the vortex energy into mechanical energy to thus provide power output substantially higher than otherwise achievable by the turbines alone; the illustrative vortex generators are delta planforms deployed in mirror symmetric fashion with their apices adjacent to define the apex of a horizontal "V" configuration such that the apex points into the wind, the plane of symmetry aligns with the wind direction, and the angle of the "V" provides the required angle of attack for each planform relative to the wind axis. A three point mounting system employing a pivot near the apex and wheels adjacent the trailing edge, provides the required azimuthal mobility.

8 Claims, 3 Drawing Figures

DOUBLE VORTEX AUGMENTOR WIND CONVERSION SYSTEM

RELATED APPLICATIONS

This application is a continuation-in-part of U.S. patent application of Pasquale M. Sforza for "Fluid Flow Energy Conversion Systems", Ser. No. 564,681, filed on Apr. 3, 1975, now U.S. Pat. No. 4,047,832 dated Sept. 13, 1977 which application is incorporated herein by reference, as are the related publications "Flow Measurements in Leading Edge Vortices", Sforza et al., AIAA Fifteenth Aerospace Sciences Meeting, Los Angeles, Jan. 24–26, 1977, Publication No. 77-11; P. M. Sforza, "Vortex Augmentors for Wind Energy Conversion", International Symposium on Wind Energy Systems, Sept. 7-9, 1976, Paper E1.

BACKGROUND

The above-cited patent application discloses a new concept in wind energy conversion systems termed the vortex augmentor concept. It employs a vortex generating body, e.g., a delta planform, which functions in lens-like fashion to convert the undisturbed diffuse fluid flow intercepted by the augmentor into concentrated vortices having significantly higher flow velocities. Turbines located in the vortices convert the flow power into mechanical output power.

The vortex augmentor concept provides the potential for significant improvements in wind energy conversion: wind velocities may be doubled thereby providing the potential for an eight-fold increase in output power; alternatively, smaller rotor diameters may be employed for a given power requirement; also, useful response to lower wind velocities is realizable. In addition, control of angle of attack, camber and other parameters of the vortex generator provide additional means for controlling output power; finally, the higher velocities and rotary nature of the vortex fluid flow present opportunities for improvements in the turbine power transformation process.

OBJECTS AND SUMMARY OF THE INVENTION

The present invention has for its object to provide further improvements in the above-described vortex augmentor systems, particularly in the areas of improved azimuthal response, in the support structure requirements, in turbine size and in stability.

The invention, which achieves these objectives, may be summarized as a fluid flow energy conversion system for converting diffuse flow power into useful output power, the system comprising a pair of edge separation vortex generators symmetrically deployed in a generally "V" shaped angulated configuration having its apex region pointing upstream, its axis of symmetry aligned with the direction of fluid flow, and its included angle dimensioned such that, when so aligned, each vortex generator is deployed at the desired angle of attack.

THE DRAWINGS

Serving to illustrate the exemplary embodiments are the drawings of which:

DETAILED DESCRIPTION OF THE INVENTION

Figure 1:
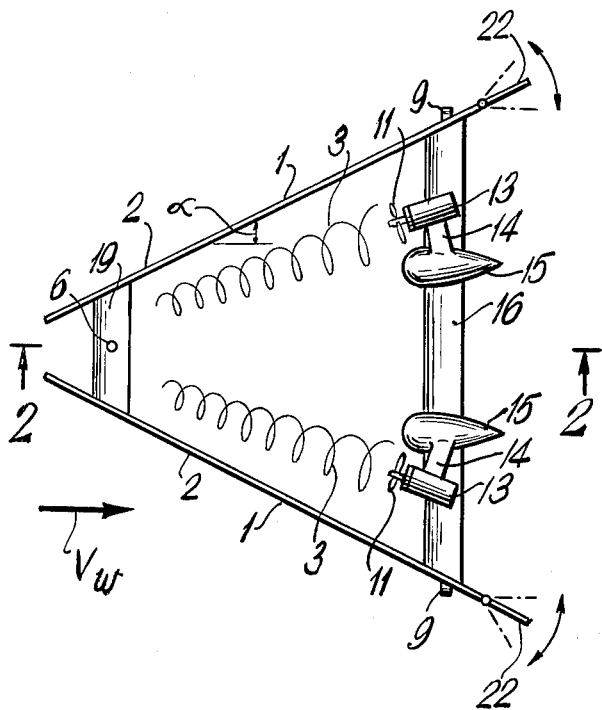
FIG. 1 is a plan schematic view of a double-delta augmentor system.
Figure 2:
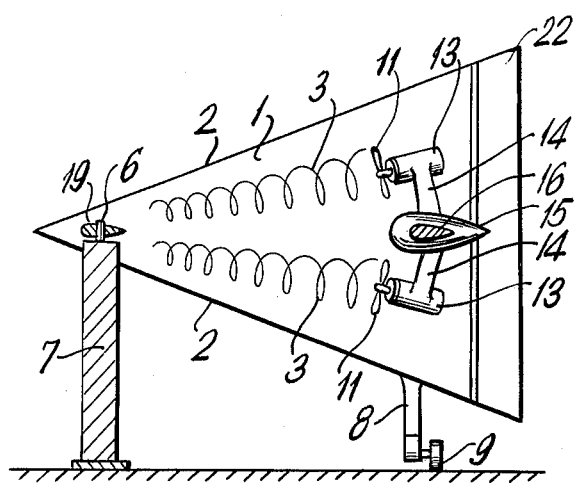
FIG. 2 is a side elevation schematic view of the system of FIG. 1 taken along the lines 2—2 of FIG. 1.

As shown in the drawings, the exemplary system employs two vortex generating augmenting surfaces embodied as delta planforms 1 deployed in mirror symmetric fashion about a plane (2—2 in FIG. 1), which, in the operating mode, is parallel to the wind direction, $V_W$. The planforms are coupled to each other with bridging structural supports 16 and 19, such that each planform is deployed at the appropriate angle of attack ($\alpha$) relative to the plane of symmetry 2—2 which contains the wind axis.

While a rigid interconnection of the planforms is illustrated, some applications may best be served by an articulated interconnection structure which permits a change of the angle or the spacing between the planforms.

In a typical application the augmentor surfaces are arranged so as to have the plane of the surface essentially vertical with the apex of the system pointing upwind. (For an alternate configuration the entire assembly may be rotated 90° so that the plane 2—2 is horizontal rather than vertical.)

Supporting the system is a three point mounting assembly consisting of a fixed forward support 7 and two rear supports 8, each of the latter being coupled to one of the two augmentor surfaces. The forward support is pivotally connected with the aid of a pivot 6 to strut 19 so as to allow the entire assembly consisting of the two augmentor surfaces to rotate about this point as a unit. In furtherance of this function, the bases of the two rear supports each terminate in a wheel 9 or its equivalent to allow the azimuthal motion of the structure with respect to the ground plane (means, not shown, may also be employed to temporarily render the nose support 7 mobile so that the entire unit may be transported).

The augmentor surfaces 1 each generate two concentrated vortices 3 due to flow separation along the sharp leading edges 2. Accordingly, in this realization of the system there are four vortices so formed.

Intercepting these vortices are four respective turbines 11, essentially coaxial and coextensive with the vortices, for the purpose of transforming the kinetic energy of the vortices into useful shaft work.

Figure 3:
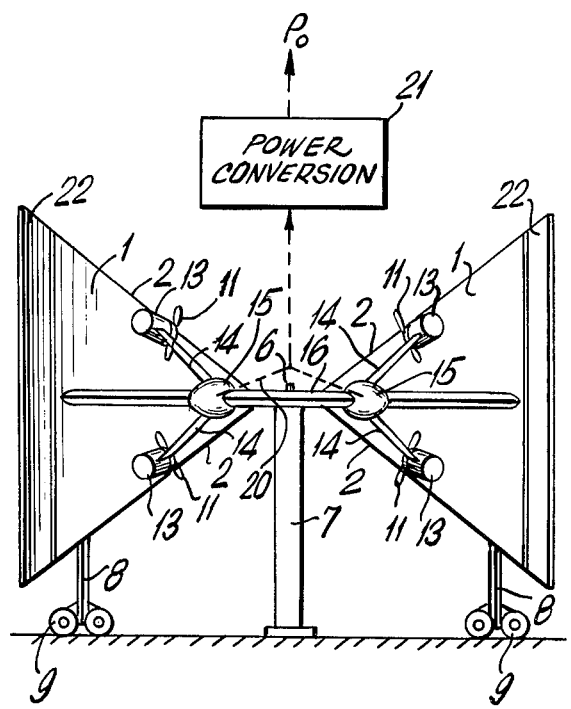
FIG. 3 is an upstream elevation schematic view of the system of FIGS. 1 and 2.

Each pair of turbines is mounted on a respective support housing 15 joined to the strut 16, with each turbine of the pair being connected to housing 15 via a respective strut 14. Each of the turbine shafts may be enclosed by a nacelle 13 within which transmission means are provided for transmitting the shaft work to housing 15 via a further transmission in each strut 14. Each housing 15 may contain further transmission means interconnected as schematically indicated at 20, FIG. 3, to power conversion mens 21 which supply output power Po. Alternatively, power converters may be supplied in each nacelle 13 or in each housing 15, driven by the respective pair of turbines.

In the operation of the system, the augmentor weathercocks into the wind thus aligning each planform at the desired angle of attack to concentrate the natural wind into, here, four distinct vortices. The power extracted from the flow by the four turbines is equivalent to the power extracted by a very much larger single turbine in the same wind field. For example, with a typical vortex augmentation factor of 6, the present system with four 20 foot diameter rotors would replace a single 100 foot diameter rotor.* Since the rotor is a very expensive component, this possibility of using small rotors is an important economy. Of course, other advantageous features of vortex augmentation, referred to in the cited application, are also available including employment of flaps 22. *6 For comparison, it would otherwise require four 50 foot diameter unaugmented turbines.

In addition, when the pivot point 6 is located upstream of the line joining the centers of area of the two augmentor surfaces, the system is aerodynamically stable and consistently seeks to head itself into the wind. In other words the system acts like a weathercock and the aerodynamic forces may be used to align the system into the wind. This obviates the need for any azimuthal control and sensing system. However, if for various reasons of construction or low winds, etc., the aerodynamic forces are insufficient to drive the entire unit, supplemental power may be supplied to the rear strut wheels 9 to head the unit into the wind. Even in such a case where it is deemed desirable to have positive drive for control of forward heading, the power requirements will be low because of the large moment arm between the driving wheels and the pivot.

Another feature resides in the fact that the structural arrangement is less subject to the vibrational and other difficulties which attend conventional tower mounted wind turbines.

What is claimed is:

1. A fluid flow energy conversion system for converting diffuse flow power into useful output power, the system comprising turbine means, and a pair of edge separation vortex generators symmetrically deployed in a generally V shaped angulated configuration for driving said turbine means, said configuration including means for orienting the configuration such that the apex region thereof points upstream and the axis of symmetry substantially aligns with the direction of fluid flow and wherein the configuration is dimensioned such that each vortex generator is deployed at a desired angle of attack with respect to said fluid flow.

2. The system as defined in claim 1 wherein each of said generators comprises a delta planform.

3. The system as defined in claim 1 in which each of said vortex generators is configured to develop at least two vortices, and in which said turbine means are positioned in at least said two vortices of each generator.

4. The system as defined in claim 1 in which each vortex generator is configured such that at least two vortices are generated in the space between said vortex generators, said system further including means mounting said turbine means to intercept each of said vortices.

5. The system as defined in claim 1 in which said vortex generators each comprise a delta planform configured to generate a pair of vortices in the space between said generators, said system further including means interconnecting said planforms in the downstream regions thereof.

6. The system as defined in claim 5 in which said turbine means are mounted on said connecting means and positioned to intercept said vortices.

7. The system as defined in claim 1 including means permitting said system to pivot azimuthally about an axis adjacent said apex region.

8. The system as defined in claim 7 including flap means coupled to the trailing edge of each planform.

* * * * *